(12) United States Patent
Innis et al.

(10) Patent No.: US 9,815,566 B1
(45) Date of Patent: Nov. 14, 2017

(54) VERTICAL SPEED INDICATOR GENERATING SYSTEM, DEVICE, AND METHOD

(71) Applicant: ROCKWELL COLLINS, INC.

(72) Inventors: John D. Innis, Mount Vernon, IA (US); Daniel I. Moore, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 44 days.

(21) Appl. No.: 14/640,304

(22) Filed: Mar. 6, 2015

(51) Int. Cl.
G06F 3/0488 (2013.01)
B64D 43/02 (2006.01)
B64D 47/00 (2006.01)

(52) U.S. Cl.
CPC ............ *B64D 43/02* (2013.01); *B64D 47/00* (2013.01)

(58) Field of Classification Search
None
See application file for complete search history.

(56) References Cited

U.S. PATENT DOCUMENTS

| | | | | |
|---|---|---|---|---|
| 8,159,464 | B1* | 4/2012 | Gribble | G06F 3/038 178/18.01 |
| 2003/0193410 | A1* | 10/2003 | Chen | G01C 23/005 340/971 |
| 2005/0085959 | A1* | 4/2005 | Feyereisen | G01D 5/00 701/14 |
| 2015/0205302 | A1* | 7/2015 | Buisson | G05D 1/101 701/18 |
| 2016/0026190 | A1* | 1/2016 | Kowalski | G05D 1/0808 701/7 |

* cited by examiner

*Primary Examiner* — Abby Lin
*Assistant Examiner* — Paul Castro
(74) *Attorney, Agent, or Firm* — Daniel M. Barbieri; Donna P. Suchy; Angel N. Gerdzhikov

(57) ABSTRACT

A system, device, and method for generating a vertical speed indicator (VSI) are disclosed. The VSI generating system may include a source of first vertical speed (V/S) data, a source of second V/S, an image generator (IG), and a display system. The IG may be configured to acquire first V/S data; acquire second V/S data; and generate image data as a function of the first V/S data and the second V/S data. The first V/S data could include actual V/S, and the second V/S data could include a target V/S other than a manually-selected V/S. The image data could be representative of an image of an aircraft VSI comprised of at least one indication of the actual V/S, and at least one indication of the target V/S other than a manually-selected V/S.

20 Claims, 6 Drawing Sheets

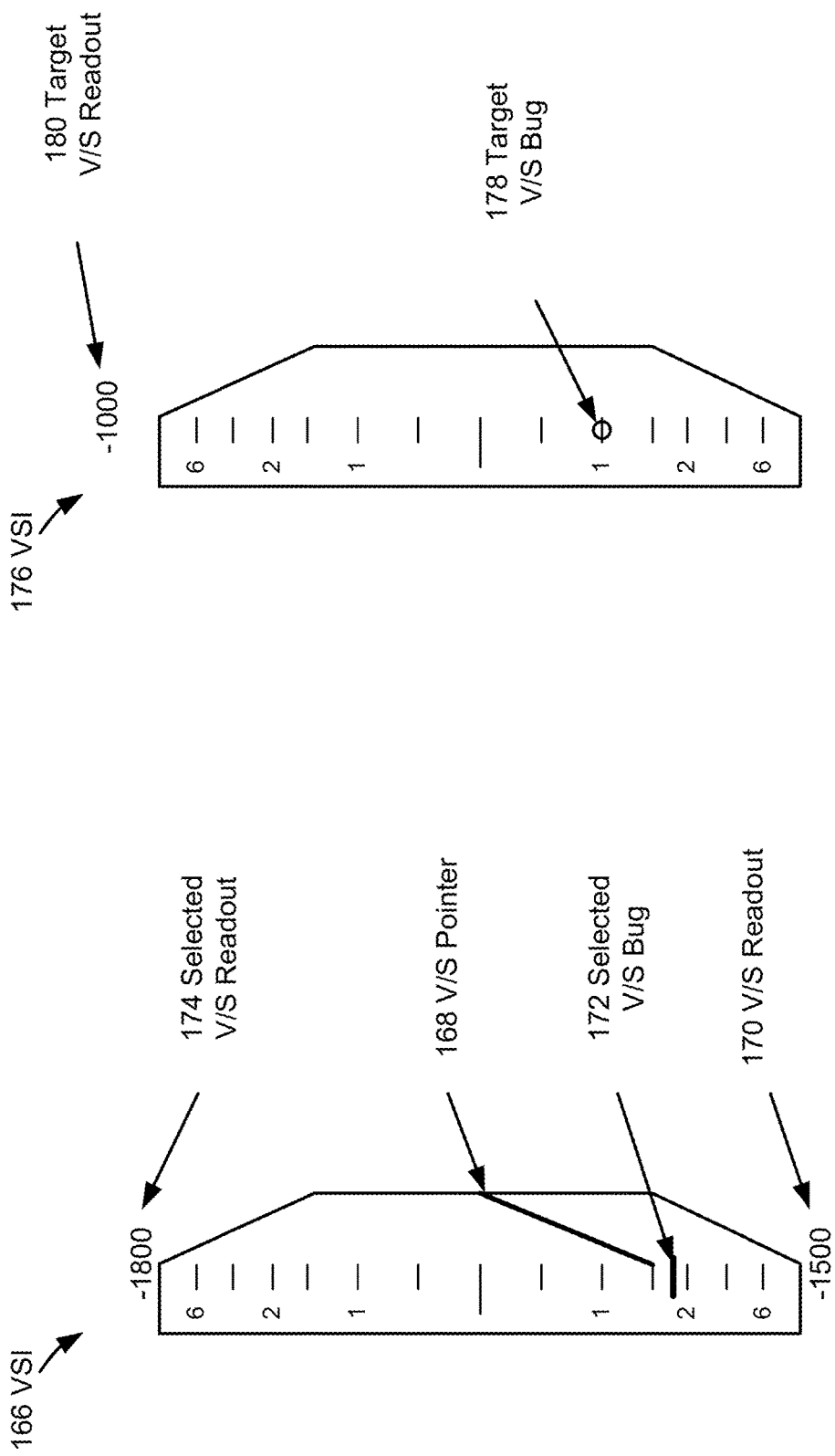

VERTICAL SPEED INDICATOR GENERATING SYSTEM, DEVICE, AND METHOD

BACKGROUND

Field of the Inventive Concepts

The inventive concepts disclosed herein pertain generally to the field of aircraft display units that present information to the pilot of an aircraft.

Description of the Related Art

An aircraft is comprised of many systems, and some of these include a pilot interface system, a flight director (FD) system, an autoflight system, a flight management system (FMS), and a display system. Comprised of selection devices such as knobs, pushbutton switches, rotary switches, thumbwheels, and/or touchscreens, the pilot interface system may be used by the pilot to engage the autoflight system and/or to select or choose the flight mode and/or parameters associated with lateral and vertical flight modes.

Lateral flight mode selection devices could provide a means with which the pilot may select a heading and/or engage a heading mode, where such engagement may provide the autoflight system with roll guidance information to capture and track the heading selected in the window. A navigation mode could be engaged to provide the autoflight system with roll guidance information to capture and track the lateral commands provided by the FMS.

Vertical flight mode selection devices could provide a means with which the pilot may select a speed and/or a source of speed mode. An FMS speed mode could be engaged as one source of speed that may limit the speed to, for example, the lower of an optimum speed, a climb speed limit, or a speed constraint imposed by the FMS through the use of the climb phase prediction profile as discussed above. A manual speed mode could be engaged as another source of speed that may be used by the pilot to select a speed and used by the FMS for prediction purposes.

Also, vertical flight mode selection devices could provide a means with which the pilot may select a vertical speed (V/S) and/or source of a V/S mode. A manual V/S mode could be engaged to allow the pilot to manually select the vertical flight path using a manually-selected V/S.

The pilot interface system may be used to enable the FD system and the depiction of an FD (i.e., symbology of an FD) for providing visual vertical and lateral guidance information commensurate with the sections of the lateral and/or vertical flight modes made by the pilot. If the V/S mode has been engaged and a V/S manually-selected, the FD symbology could react accordingly in response to the pilot's actions. In addition to selecting a V/S and being provided with vertical guidance by the FD symbology, the value of the V/S selected by the pilot could be presented as a "bug" on a V/S indicator (VSI) by the display system.

An FMS V/S mode could be engaged to allow the pilot to select a target V/S that may be automatically computed by the FMS and dependent upon a vertical flight path predicted by the FMS. The FMS may provide the FD system with the target V/S from which the FD system may determine the appropriate vertical guidance and present this guidance visually via the FD symbology. While the computed target V/S may be communicated graphically to the pilot as FD symbology, the value of the target V/S is not.

SUMMARY

Embodiments of the inventive concepts disclosed herein are directed to a system, device, and method for generating an aircraft VSI that presents a value of a computed target V/S. The VSI could be used to enhance situational awareness of a pilot by providing a computed value of target V/S and enabling an opportunity to view the computed target V/S with the actual V/S of the aircraft in the same indicator.

In one aspect, embodiments of the inventive concepts disclosed herein are directed to a system for generating an aircraft VSI. The aircraft VSI generating system may include a source of first V/S data, a source of second V/S, an image generator (IG), and a display system.

In a further aspect, embodiments of the inventive concepts disclosed herein are directed to a device for generating an aircraft VSI. The device may include the IG and may be configured (or programmed) to perform a method of generating an aircraft VSI presentable to a viewer.

In a further aspect, embodiments of the inventive concepts disclosed herein are directed to a method for generating an aircraft VSI. When properly configured, the IG may acquire first V/S data, acquire second V/S data, and generate image data as a function of the first V/S data and the second V/S data. The first V/S data could include actual V/S, and the second V/S data could include a target V/S other than a manually-selected V/S. In some embodiments, the IG may acquire third V/S data that includes a manually-selected V/S.

BRIEF DESCRIPTION OF THE DRAWINGS

FIG. 3B depicts an exemplary illustration of an aircraft VSI presenting actual and manually-selected V/Ss.

FIG. 4 depicts an exemplary illustration of an aircraft VSI presenting a target V/S.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1:
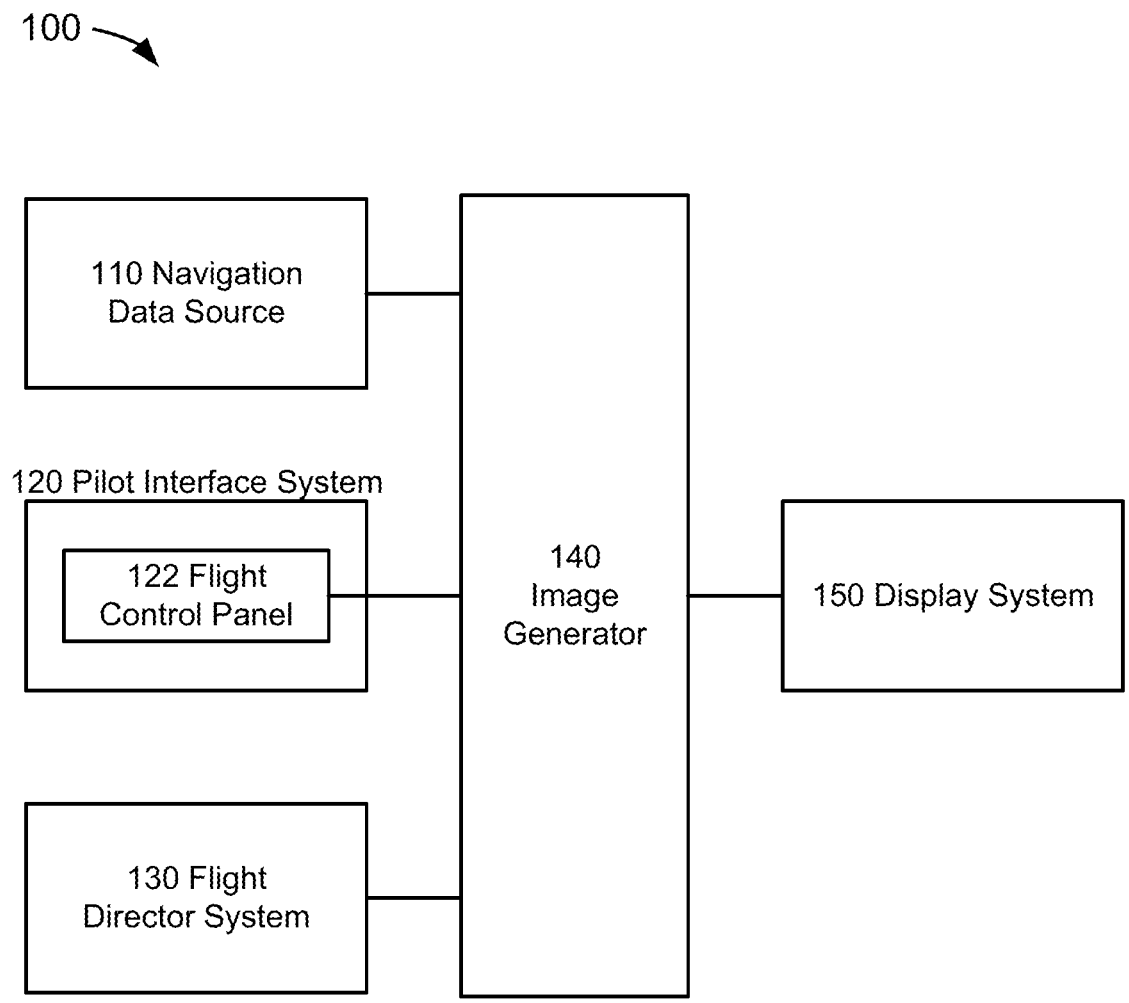
FIG. 1 depicts a block diagram of a system for generating an aircraft VSI.

FIG. 1 depicts a block diagram of an aircraft vertical speed indicator (VSI) generating system 100 suitable for implementation of the techniques described herein. The VSI generating system 100 of the embodiment of FIG. 1 includes a navigation data source 110, a pilot interface system 120, a flight director (FD) system 130, an image generator (IG) 140, and a display system 150.

Referring to FIG. 1, the navigation data source 110 could include any source(s) which provides navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, attitude, speed, ground speed, vertical speed (V/S), and/or time. Aircraft position may be comprised of geographic position (e.g., latitude and longitude coordinates) and altitude, and ground track may be derived from either geographic position, aircraft position, or both. Aircraft orientation may be comprised of pitch, roll, and/or yaw information related to the attitude of the aircraft.

The navigation data source 110 could further include a flight management system (FMS). The FMS may perform a variety of functions performed to help the crew in the management of the flight; these functions are known to those skilled in the art. These functions could include receiving a flight plan and constructing a lateral and vertical flight plan from the flight plan. A pilot could create a flight plan from waypoints stored in a database or select a flight plan stored in a database of the FMS. Also, the flight plan may be modified at any time. As embodied herein, aircraft could mean any vehicle which is able to fly through the air or atmosphere including, but not limited to, lighter than air vehicles and heavier than air vehicles, wherein the latter may include fixed-wing, rotary-wing, and unmanned vehicles.

In a lateral flight plan, the FMS could perform many functions including, but not limited to, navigational computations, radio navigation aids selections, and providing lateral flight information which could maintain the aircraft along the flight plan from takeoff to landing. In a vertical flight plan, the FMS could compute an optimum speed at each point, other characteristic speeds, and the aircraft weight and center of gravity. Then, it could compute predictions along the flight plan based on these speeds and weight. It could also provide vertical flight information in reference to such predictions. Other miscellaneous performance computations are also made. Computations and underlying algorithms performed by the FMS are known to those skilled in the art.

The pilot or flight crew may initialize the FMS including, but not limited to, the selection of a flight plan, where such flight plan could provide the basis for all computations and displays. A flight plan may be composed of various lateral and vertical elements that may be defined during initialization, and may be defined from navigation data stored in an FMS database.

Lateral elements of a flight plan could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and/or a holding procedure; and/or a flight plan to an alternate airport. Such procedures may be defined by various legs and waypoints between legs.

Vertical elements could include a takeoff altitude which may include, but is not limited to, a thrust reduction altitude; an acceleration altitude; altitude constraints at one or more waypoints located along the flight path; V/S and/or flight path angle constraints at one or more waypoints located along the flight plan; speed constraints at one or more waypoints along the flight plan; climb and descent speed limits; climb and descent step legs; and cruise flight levels. A vertical element could also include a cost index for the flight plan, a parameter that may determine flight time cost in units of fuel flow for providing information related to fuel cost versus time cost. The cost index could include a scale of optimization, where a low cost index may be associated with optimizing fuel consumption and a high cost index with optimizing time.

As noted above, a flight plan may be changed or revised at any time after initialization. For lateral elements, waypoints could be inserted or deleted; holding procedures could be inserted or modified; legs to fly directly to waypoints may be inserted; a DP or STAR procedure may be modified or introduced into the flight plan; the destination or alternate airport may be changed; and/or an offset path could be created to avoid hazardous meteorological conditions. For vertical elements, constraints associated with altitude, V/S, flight path angle, and speed between waypoints could be inserted, modified, or deleted; and/or climb and descent speeds could be inserted, modified, or deleted as well as climb and descent step legs. Cruise flight levels and a cost index could also be modified.

With respect to vertical elements, the FMS may compute various speeds or mach numbers for the purpose of predicting time and fuel consumption. The predictions may be based on phase of flight profiles using assumptions based on pre-computed allowances and may take into account an actual flight profile established when an autopilot is engaged. The following brief discussion regarding the use of prediction profiles for the various phases of flight is provided for the purpose of illustration only and not of limitation.

A prediction profile of a take-off phase of flight may assume an aircraft is flown with maximum take-off thrust at a specific speed until a thrust reduction altitude is reached. This could be followed with a prediction profile assuming the aircraft is flown with maximum climb thrust at a specific setting until an acceleration altitude is reached. Then, a prediction profile of a climb phase may assume the aircraft is flown with maximum climb thrust from the acceleration altitude until a climb speed selected by the pilot or aircrew is reached or the lower of an optimum speed, a climb speed limit, or a speed constraint is reached, thereby satisfying speed limits or constraints imposed upon the climb phase prediction profile; the pilot may select a speed using a device of the pilot interface system 120 as discussed below. As embodied herein, the FMS could receive data input from other aircraft systems including, but not limited to, data representative of one or more flight modes and/or parameters from the pilot interface system 120. In addition, the FMS could provide data representative of a flight plan to other aircraft systems including, but not limited to, the FD system 130 and the IG 140 as discussed herein.

As shown in FIG. 1, the pilot interface system 120 may be a system and/or device which allows the pilot to engage an aircraft's autoflight system, to select or choose flight modes and/or parameters, or both. An autoflight system could include, but is not limited to, the FD system 130, an autopilot system, and/or an autothrottle system.

Figure 2:
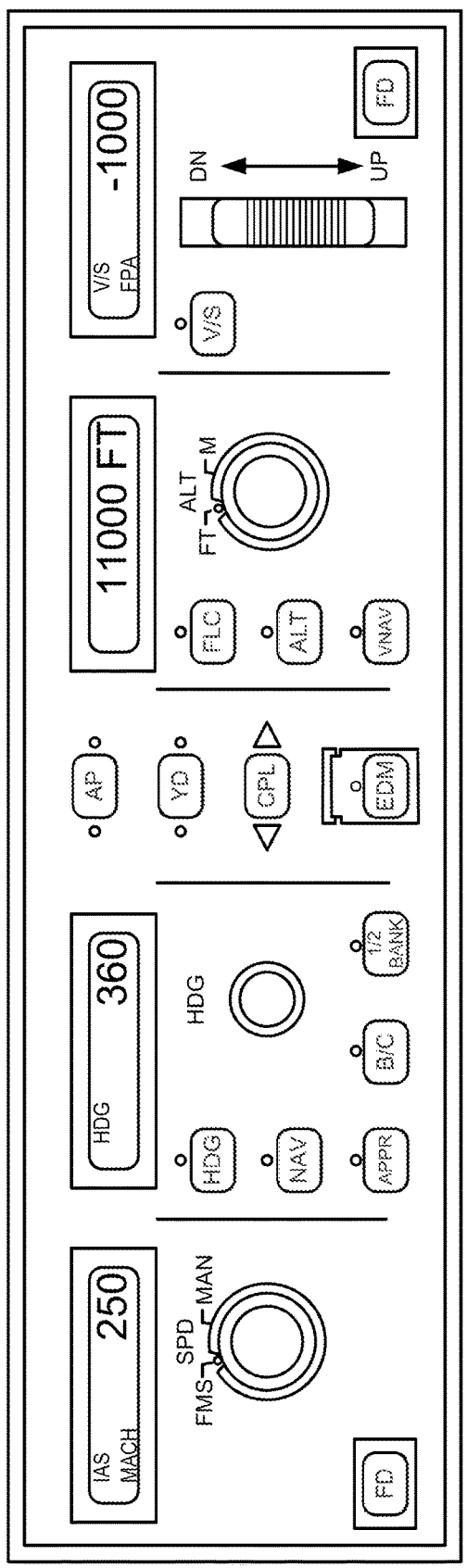
FIG. 2 depicts an exemplary illustration of a flight control panel.

Referring to FIG. 2, an exemplary illustration of a flight control panel ("FCP") 122 is depicted. Known to those skilled in the art, the FCP 122 may come in many shapes, sizes, and configurations. The FCP 122 shown in FIG. 2 is provided as an exemplar of the pilot interface system 120 comprised of a cockpit panel having flight mode and/or parameter selection devices including a knob, pushbutton switches, rotary switches and a thumbwheel. These devices may be used by the pilot to select or choose the flight mode and/or parameters. Also, these devices may be used to engage an aircraft's autoflight system. The FCP 122 could represent any device of the pilot interface system 120 from which the pilot may choose to make such selection and/or engagement, and although the following discussion will be drawn to the FCP 122, the pilot interface system 120 is not limited to the FCP 122 shown in FIG. 2.

The FCP 122 depicts flight mode and/or parameter selection devices associated with lateral and vertical flight modes. As shown in FIG. 2, lateral flight mode selection devices include the knob and switches under the window with the HDG 360 indication ("heading window"). The HDG rotary knob may provide the means with which the pilot may select a heading, the selected heading appearing in the heading window. A heading mode could be engaged by pressing the HDG pushbutton switch, where such engagement may provide the autoflight system with roll guidance information to capture and track the heading selected in the heading window. A navigation mode could be engaged by pressing the NAV pushbutton switch, where such engagement may provide the autoflight system with roll guidance information to capture and track the lateral commands provided by the FMS. An approach mode, backcourse mode, or a half-bank mode could be engaged by pressing the APPR, B/C, and ½ BANK pushbutton switches, respectively, where such engagement may provide the autoflight system with roll guidance information to capture and track a localizer, to capture and track the backcourse of a localizer, and to reduce the roll limits of the system, respectively.

Vertical flight modes and/or parameter selection devices include those switches under the windows with the indications of IAS-MACH 250 ("speed window"), 11000 FT ("altitude window"), and V/S-FPA-1000 ("V/S window"). The SPD rotary switch under the speed window may provide the means with which the pilot may select a speed from two sources of speed. By selecting FMS with the SPD rotary switch, an FMS speed hold mode could be engaged, where the speed could be limited to the lower of an optimum speed, a speed limit, or a speed constraint imposed by the FMS through the use of a prediction profile as discussed above. By selecting MAN with the SPD rotary switch, a manual speed hold mode could be engaged, where the speed could be selected by the pilot and used by the FMS for prediction purposes. A concentric knob may provide the means with which the pilot may select a speed. The speed window nay indicate the selected speed. The FD pushbutton switch may enable the depiction of an FD (i.e., symbology of an FD) for providing vertical and lateral guidance information visually as discussed in detail below. It should be noted that the indications of IAS and MACH will not normally be displayed simultaneously in the speed window.

The ALT rotary switch under the altitude window may provide the means with which the pilot may select the unit of measurement for altitude, i.e., feet (FT) or meters (M). A concentric knob may provide the means with which the pilot may select an altitude; the selected altitude may appear in the altitude window. A flight level change ("FLC") mode could be engaged by pressing the FLC pushbutton switch, where such engagement may provide the autoflight system with pitch guidance to climb or descend towards the selected altitude at either a preprogrammed reference speed or capturing and tracking the speed indicated in the speed window without regard to FMS vertical guidance. An altitude select mode could be engaged by pressing the ALT pushbutton switch, where such engagement may provide the autoflight system with pitch guidance to capture and track the selected altitude without regard to a preprogrammed reference speed, the speed indicated in the speed window, and FMS vertical guidance. A VNAV mode could be engaged by pressing the VNAV pushbutton switch, where such engagement may provide the autoflight system with pitch guidance provided by a source of vertical guidance including, but not limited to, the FMS without regard to the altitude indicated in the window, a preprogrammed reference speed, and the speed indicated in the speed window. By selecting the FLC mode or ALT mode, the autopilot may control the vertical path of the aircraft using the selected modes and not the flight plan computed by the FMS using a prediction profile.

A V/S mode could be engaged by pressing the V/S pushbutton switch under the V/S window, where such engagement may provide the autoflight system with pitch guidance to hold the V/S (or flight path angle if configured with FPA) selected in the window, where the means of selecting the V/S is provided with the DN-UP thumbwheel knob. By selecting the V/S parameter, the autopilot may control the vertical path of the aircraft using the selected parameter and not the flight plan computed by the FMS using a prediction profile. The FD pushbutton switch may enable the depiction of an FD providing vertical and lateral guidance information. It should be noted that the indications of V/S and FPA will not normally be displayed simultaneously in the V/S window.

The pushbutton switches AP, YD, CPL, and EDM in the center of FCP 122 may provide the means for the pilot to engage the autopilot, yaw damper, a coupling the autopilot with a navigation signal, and an emergency descent mode, respectively.

Returning to FIG. 1, the FD system 130 as embodied herein comprises a system that could provide lateral and vertical guidance to an autoflight system based on data received from other aircraft system(s), panel(s), and/or component(s) including, but not limited to, the FMS and the FCP 122. As stated above, lateral and vertical guidance may be provided visually to the pilot through the depiction of an FD. Also, lateral and vertical guidance may be provided to an autopilot system for controlling the position of control surfaces on the roll, pitch, and/or yaw axes and to an autothrottle system for controlling engine thrust. The determination of guidance data may be computed by the FD system 130 through the use of guidance algorithm(s) by applying the data received from other aircraft systems to the guidance algorithm(s). The knowledge and use of guidance algorithm(s)—and the application of the received data to the guidance algorithm(s)—are known to those skilled in the art.

The depicted position of the FD may depend on a mode selected on the FCP 122 by the pilot; for the purposes of the following discussion, the FD pushbutton switch on the FCP 122 has been engaged, thereby enabling the visual depiction of the FD for providing lateral and vertical guidance. For example, the pilot may want to follow a flight plan of the FMS. If so, he or she may engage the NAV pushbutton switch mode for lateral guidance and select the VNAV pushbutton switch for vertical guidance.

With respect to vertical guidance, the FMS may predict the vertical flight path by applying the one of two speeds based on a speed hold mode selected by the pilot using the SPD rotary switch. By selecting MAN with the SPD rotary switch (and assuming a descent path), a selected descent speed could be used by the FMS for prediction purposes. By selecting FMS with the SPD rotary switch, a descent speed could be limited to the lower of an optimum speed, a climb speed limit, or a speed constraint imposed by the FMS through the use of the descent phase prediction profile as discussed above.

After the pilot has made these selections, data representative of the pilot's selections may be provided to the FD system 130. Through the application of this data to guidance algorithms, the FD system 130 may compute and provide visual lateral and vertical guidance to the display system 150. The lateral and vertical guidance may be represented respectively by the horizontal and vertical positioning of the FD as computed by the FD system 130.

In another example, the pilot may want to follow a lateral flight plan of the FMS but not a vertical flight plan of the FMS; instead, the pilot may want to manually select the vertical flight path using a constant V/S (or flight path angle) until the altitude indicated in the altitude window of the FCP 122 is reached. If so, he or she may engage the NAV pushbutton switch mode for lateral guidance and select the V/S pushbutton switch for vertical guidance and select the V/S using the thumbwheel. After the pilot has made these selections, data representative of the pilot's selections may be provided to the FD system 130. Through the application of this data to guidance algorithms, the FD system 130 may compute and provide visual lateral and vertical guidance to the display system 150. The vertical guidance may be represented by the vertical positioning of the FD to achieve the selected V/S as computed by the FD system 130 until the selected altitude is reached.

In another example, the pilot may want to follow a lateral flight plan of the FMS but not a vertical flight plan of the FMS; instead, the pilot may want to manually select the vertical flight path using a manually-selected speed. If so, he or she may engage the NAV pushbutton switch mode for lateral guidance and select the FLC pushbutton switch for vertical guidance and select the new altitude using the ALT knob. Also, he or she may select the speed by turning the SPD rotary switch to MAN and selecting the speed with the SPD knob. After the pilot has made these selections, data representative of the pilot's selections may be provided to the FD system 130. Through the application of this data to guidance algorithms, the FD system 130 may compute and provide lateral and vertical guidance to the display system 150, where the vertical guidance corresponds to the altitude and manually-selected speed by the pilot. The vertical guidance may be represented by the vertical positioning of the FD to achieve the manually-selected speed as computed by the FD system 130 until the selected altitude is reached.

In another example, the pilot may want to follow a lateral flight plan of the FMS but not a vertical flight plan of the FMS; instead, the pilot may want to manually select the vertical flight path to climb to a different altitude using a speed determined by the FMS. If so, he or she may engage the NAV pushbutton switch mode for lateral guidance and select the FLC pushbutton switch for vertical guidance and select the new altitude using the ALT knob. Also, he or she may select the speed by turning the SPD rotary switch to FMS. After the pilot has made these selections, data representative of the pilot's selections may be provided to the FD system 130. Through the application of this data to guidance algorithms, the FD system 130 may compute and provide lateral and vertical guidance to the display system 150, where the vertical guidance corresponds to the altitude selected by the pilot and FMS-selected speed. The vertical guidance may be represented by the vertical positioning of the FD to achieve the FMS-selected speed as computed by an FD system 130 until the selected altitude is reached.

The IG 140 could include any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PC-MCIA card), secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IG 140 could also consist of more than one electronic data processing units. In some embodiments, the IG 140 could be a processor(s) used by or in conjunction with any other system of the aircraft including, but not limited to, the navigation data source 110 including the FMS, the pilot interface system 120, the FD system 130, and the display system 150.

In some embodiments, the terms "programmed" and "configured" are synonymous. The IG 140 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a data bus, through a wireless network, or as a signal received and/or transmitted by the IG 140 via a physical or a virtual computer port. The IG 140 may be programmed or configured to execute the method discussed in detail below. The IG 140 may be programmed or configured to provide output data to various systems and/or units including, but not limited to, the display system 150.

The display system 150 could be comprised of one or more display units configured to present information visually to the pilot. The display unit could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist and head mounted devices. The display system 150 may be configured to present one or more display(s) or image(s). In some embodiments, the terms "display" and "image" are interchangeable and treated synonymously.

Figure 3A:
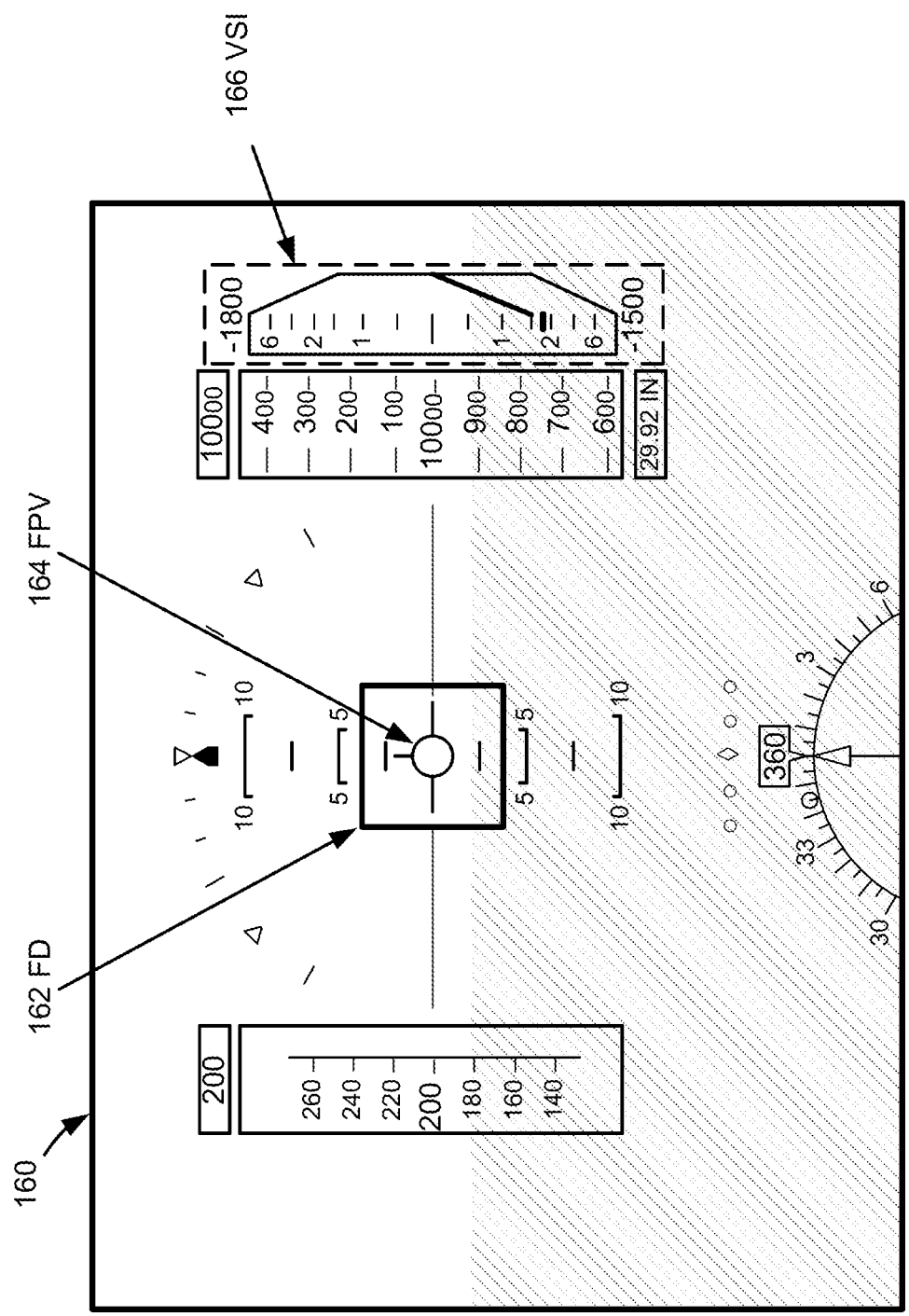
FIG. 3A depicts an exemplary illustration of an image presented on a display unit.

Referring now to FIG. 3A, an exemplary illustration of an image presented on a display unit 160 is depicted. Although it may resemble a classic, electronic PFD known to those skilled in the art that provides a blue/brown sky/ground artificial horizon, the display unit 160 as embodied herein includes any HDD and/or a HUD that could present or depict synthetic and/or enhanced sky/terrain artificial horizon generated by vision systems including, but not limited to, a synthetic vision system ("SVS"), an enhanced vision system ("EVS"), or a combined SVS-EVS. Although the discussion herein will be drawn to an image resembling a PFD, the embodiments herein are not limited solely to PFDs but include any display unit that could provide flight information including V/S.

The flight information displayed on the display unit 160 could be information relevant to the instant or immediate control of the aircraft, whether the aircraft is in flight or on the ground. As shown in FIG. 3A, the display unit 160 has been configured to present the "basic T" information known to those skilled in the art as airspeed, attitude, altitude, and heading. Also, the display unit 160 has been configured to present an FD 162 used to indicate the horizontal and/or vertical guidance provided by the FD system 130, a flight path vector (FPV) 164 used to indicate real-time flight path, and a VSI 166. When the FPV 164 is centered with the FD 162, the aircraft is following the horizontal and/or vertical guidance provided by the FD system 130; if not centered, the pilot could follow the guidance by "steering" the aircraft until the FPV 164 is centered on the FD 162.

The symbology of the FD 162 is depicted as a rectangle (specifically, a square), and the symbology of the FPV 164 is depicted as an airplane. Those skilled in the art understand that the FD and FPV may be depicted or configured using other symbologies of different shapes, colors and/or forms including, but not limited to, a donut, a bull's-eye, horizontal and/or vertical bars, or wings.

The VSI 166 may indicate the actual V/S being experienced by the aircraft in real-time. Referring now to FIG. 3B, the actual V/S may be indicated graphically as shown by the V/S pointer 168, non-graphically (e.g., alphanumerically) as shown by the V/S readout 170, or both. As indicated by these, the actual V/S is negative 1,500 feet per minute (fpm), where the digits of the scale represent thousands of feet.

As stated above, the pilot may want to manually select the vertical flight path using a constant V/S (or flight path angle) until the altitude indicated in the altitude window of the FCP 122 is reached by, for example, engaging the NAV pushbutton switch mode for lateral guidance, selecting the V/S pushbutton switch for vertical guidance, and selecting the V/S using the thumbwheel. These actions may result with the presentation of vertical guidance represented by the vertical positioning of the FD 162 to achieve the selected V/S until the selected altitude is reached.

In addition to the actual V/S, a manually-selected V/S may be indicated on the VSI 166. The manually-selected V/S may be indicated graphically as shown by the selected V/S bug 172 non-graphically as shown by the selected V/S readout 174, or both. As indicated by these, the selected V/S is negative 1,800 fpm. In some embodiments in which the FD system 130 is not employed, vertical guidance corresponding to the manual selection made via the pilot interface system 120 could be indicated by the selected V/S bug 172 and/or selected V/S readout 174. In these embodiments, the pilot could follow the guidance provided by the selected V/S bug 172 and/or selected V/S readout 174 by "steering" the aircraft into a climb or a descent until the V/S pointer 168 points to the selected V/S bug 172, the V/S readout 170 reads the same as the selected V/S readout 174, or both. As indicated, if the pilot wants to follow the vertical guidance being provided by the VSI 166, the pilot will have to increase the rate of the descent from the rate of negative 1,500 fpm by "steering" the aircraft further downward until the rate of negative 1,800 fpm is achieved.

In some embodiments in which the FD system 130 is employed, vertical guidance corresponding to the manual selection via the pilot interface system 120 could be indicated by not only the FD 162 but also the VSI 166. In these embodiments, the pilot could follow the vertical guidance provided by FD 162 and/or the VSI 166 by "steering" the aircraft until (1) the FPV 164 is centered on the FD 162, (2) the V/S pointer 168 points to the selected V/S bug 172, (3) the V/S readout 170 reads the same as the selected V/S readout 174, or (4) any combination of these.

As stated above, the pilot may want to follow a flight plan of an FMS by, for example, engaging the NAV pushbutton switch mode for lateral guidance and selecting the VNAV pushbutton switch for vertical guidance. With respect to vertical guidance, the FMS may predict the vertical flight path by applying the one of two speeds based on a speed hold mode selected by the pilot using the SPD rotary switch. These actions may result with the presentation of speed-based vertical guidance represented by the vertical positioning of the FD 162, where the speed-based, vertical guidance is based upon the vertical flight path predicted by the FMS.

Some advantages and benefits of embodiments discussed herein are shown in FIGS. 4 through 6B by illustrating how a speed-based, vertical guidance may be presented by a VSI 176. The FMS could compute a target V/S corresponding to the speed-based, FMS-predicted vertical flight path.

Referring now to the VSI 176 shown in FIG. 4, the target V/S may be indicated graphically as shown by the target V/S bug 178, alphanumerically as shown by the target V/S readout 180, or both. As indicated by these, a target V/S of negative 1,000 fpm has been computed.

Figure 5C:
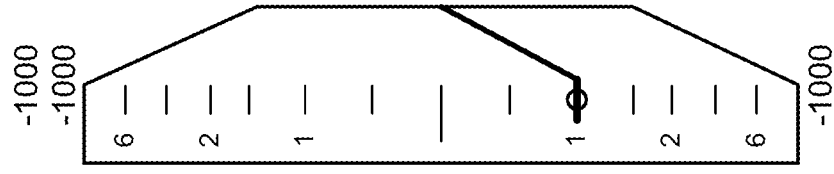
FIG. 5C depicts a third exemplary illustration of the aircraft VSI shown in FIG. 5A.
Figure 5B:
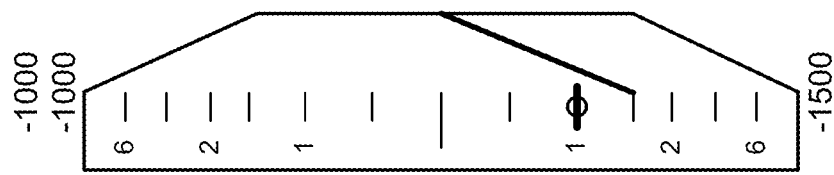
FIG. 5B depicts a second exemplary illustration of the aircraft VSI shown in FIG. 5A.
Figure 5A:
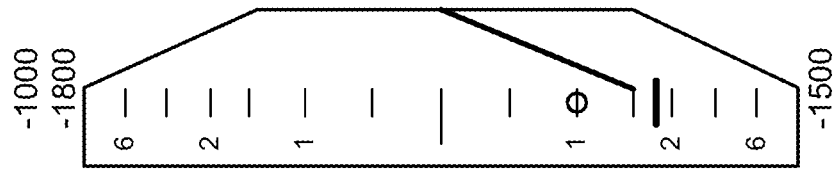
FIG. 5A depicts an exemplary illustration of an aircraft VSI presenting actual, manually-selected, and target V/Ss.

To illustrate how the target V/S bug 178 and/or the target V/S readout 180 of the VSI 176 together with the V/S pointer 168, the V/S readout 170, the selected V/S bug 172, and/or the selected V/S readout 174 of the VSI 166, two examples are provided in FIGS. 5A-5C and FIGS. 6A-6B, respectively; it should be noted that the item numbering of these have been removed for the sake of clarity. Referring now to FIG. 5A, the actual V/S of the aircraft is negative 1,500 fpm, the manually-selected V/S is negative 1,800 fpm, and the target V/S is negative 1,000 fpm. If the pilot wants to "steer" the aircraft to the target V/S of negative 1,000 fpm, he or she may select a negative 1,000 fpm via the pilot interface system 120, resulting in a movement of the selected V/S bug to negative 1,000 fpm and a change to the selected V/S readout to negative 1,000 fpm as shown in FIG. 5B. Where one or more components of an autoflight system is "slaved" to the manual selection, the aircraft may decrease the rate of descent without manual intervention until the actual V/S of negative 1,000 fpm is achieved, resulting in a movement of the V/S pointer to negative 1,000 fpm and a change to the V/S readout to negative 1,000 fpm as shown in FIG. 5C.

Figure 6B:
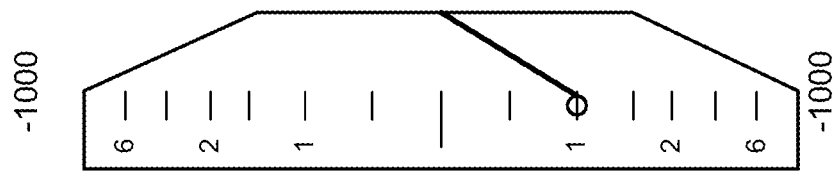
FIG. 6B depicts a second exemplary illustration of the aircraft VSI shown in FIG. 6A.
Figure 6A:
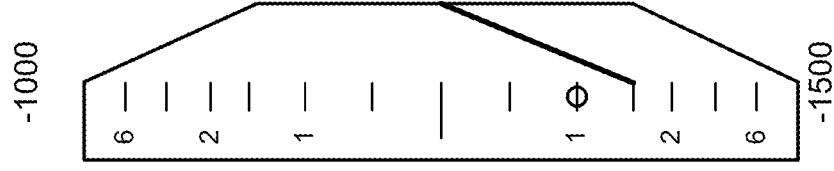
FIG. 6A depicts an exemplary illustration of an aircraft VSI presenting actual and target V/Ss.

Referring now to FIG. 6A, the actual V/S of the aircraft is negative 1,500 fpm and the target V/S is negative 1,000 fpm. If the pilot wants to "steer" the aircraft to the target V/S of negative 1,000 fpm, he or she may fly the aircraft manually using a control wheel (or colloquially, control stick) until a negative 1,000 fpm is achieved, resulting in a movement of the V/S pointer to negative 1,000 fpm and a change of the V/S readout to negative 1,000 fpm as shown in FIG. 6B.

It should be noted that, from the preceding discussion, an aircraft may be equipped with both an autoflight system and an FMS, but neither has to communicate with the other. Vertical guidance generated by the FMS does not have to be provided to the autoflight system, providing a benefit to those autoflight-equipped aircraft that are not capable of performing a coupled-VNAV operation and/or when it may be too costly for the owner and/or operator to upgrade the aircraft to reach that capability. In addition, the pilot interface system 120 does not need to be configured with a V/S window when selecting a manual V/S.

Figure 7:
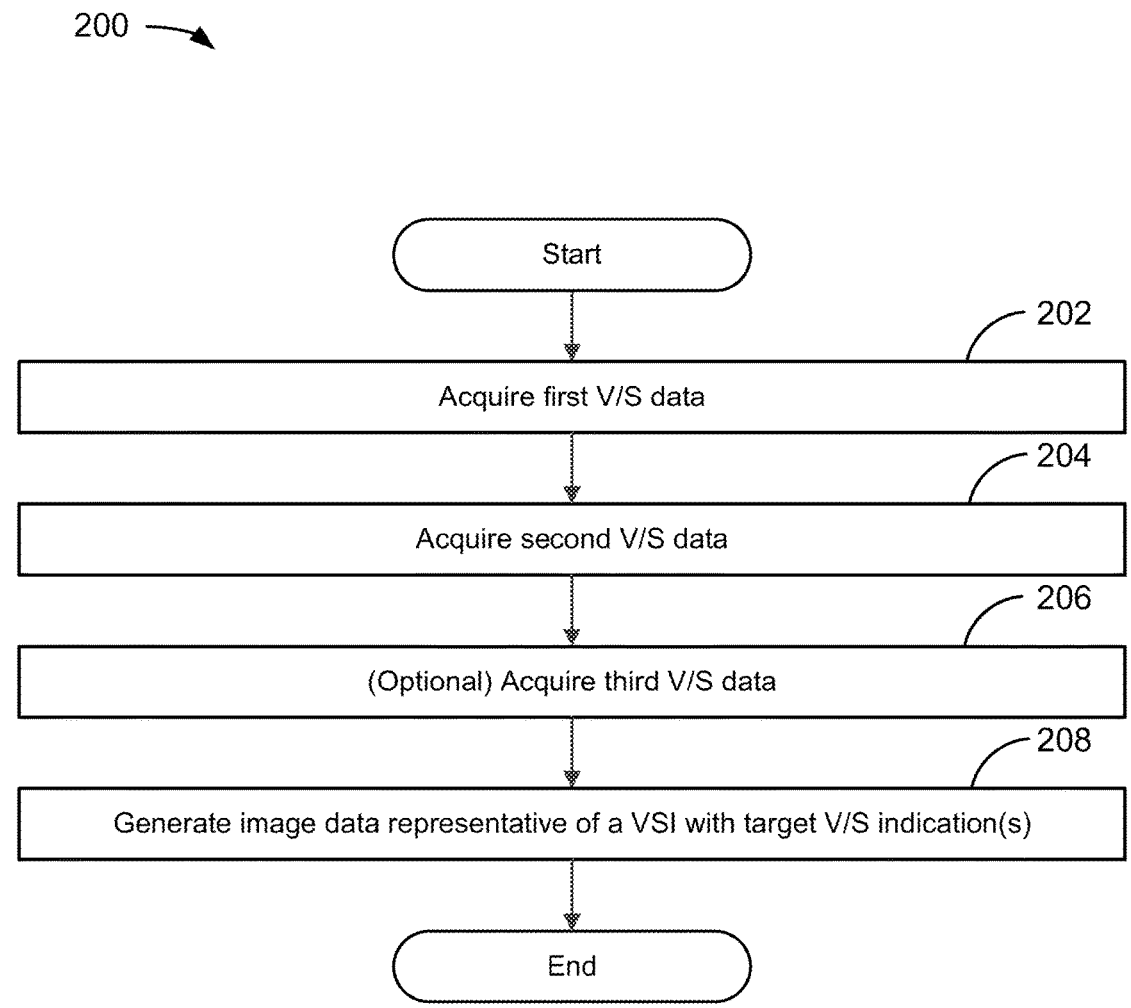
FIG. 7 illustrates a flowchart disclosing an embodiment of a method for generating an aircraft VSI.

FIG. 7 depicts flowchart 200 providing an example for generating a VSI, where the IG 140 may be programmed or configured with instructions corresponding to the following modules that that are continuously executed throughout the aircraft operation. The IG 140 may be a processing unit(s) of a module such as, but not limited to, a printed circuit card assembly having one or more input interfaces (e.g., virtual or physical computer ports) to facilitate data communications with the IG 140, i.e., the receiving and providing of data (e.g., one or more electrical or optical signals including data and/or being indicative of data). For the accomplishment of the following modules embodied in FIG. 7, the acquiring of data is synonymous and/or interchangeable with reading, receiving, and/or the retrieval of data.

The method of flowchart 200 begins with module 202 with the IG 140 acquiring first V/S data representative of an actual V/S or a measurement thereof. In some embodiments, the first V/S data may be acquired from the navigation data source 110, where the navigation data source 110 could be the FMS.

The method of flowchart 200 continues with module 204 with the IG 140 acquiring second V/S data representative of a target V/S or a measurement thereof, where the target V/S may not be the same as the V/S manually selected. In some embodiments, the second V/S data may be acquired from the navigation data source 110, where the navigation data source 110 could be the FMS. As discussed above, the FMS could compute the target V/S corresponding to the speed-based, FMS-predicted vertical flight path, where such computation may be based upon one speed of a plurality of speeds and dependent upon a pilot's selection of a source of speed made via the pilot interface system 120.

In some embodiments, the predicted vertical flight path could be a flight idle descent (FID) path. An example of a FID path has been disclosed by Ogden et al in U.S. patent application Ser. No. 14/638,522 entitled "Aircraft Energy Indicator Generating System, Device, and Method" (the Ogden reference), which is hereby and herein incorporated by reference in its entirety.

The method of flowchart 200 continues with optional module 206 with the IG 140 acquiring third V/S data representative of a manually-selected V/S. The third V/S data could be acquired via the pilot interface system 120 through which a manual selection of V/S is made.

The method of flowchart 200 continues with module 208 with the IG 140 generating image data, where the image data may be generated as a function of first V/S data and second V/S data; if third V/S data has been acquired, the function could include the third V/S data. The image data could be representative of the aircraft VSI shown in FIGS. 6A and 6B that is presentable to a viewer via the display system 150 and includes graphical and/or non-graphically indication(s) of the actual V/S and the target V/S; if third V/S data has been acquired, the image data could be representative of the aircraft VSI shown in FIGS. 5A through 5C that includes graphical and/or alphanumeric indication(s) of the manually-selected V/S.

If the predicted vertical flight path is comprised of an FID path, the IG 140 could be configured to generate additional image data representative of one or more images of aircraft energy indicators presentable to a viewer along with the VSI via the display system 150 as disclosed in the Ogden reference. Then, the method of flowchart 200 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for generating a vertical speed indicator (VSI), comprising:
    a source of actual vertical speed data;
    a source of computed vertical speed data;
    an image generator including at least one processor coupled to a non-transitory processor-readable medium storing processor-executable code and configured to:
        acquire actual vertical speed data representative of an actual vertical speed measured as a rate of change of altitude being experienced by an aircraft;
        acquire computed vertical speed data representative of a computed vertical speed computed as a rate of change of altitude by a vertical flight guidance algorithm;
        generate image data as a function of the actual vertical speed data and the computed vertical speed data, where
            the image data is representative of an image of an aircraft VSI comprised of
                at least one of a graphical indication and a numerical indication of the actual vertical speed, and
                at least one of a graphical indication and a numerical indication of the computed vertical speed; and
        provide the image data to at least one display unit; and
    the display unit configured to:
        receive the image data; and
        present the image of the aircraft VSI to the right of an image of an altimeter and an image of an attitude indicator to the left of the image of the altimeter, where
            a first computed vertical flight direction is provided by an image of a flight director overlaying the image of the attitude indicator, and a second computed vertical flight direction is provided by the at least one of a graphical indication and a numerical indication of the computed vertical speed within the aircraft VSI, whereby
an alignment or nonalignment between the graphical indications of the actual vertical speed and the computed vertical speed and an equality or inequality between the numerical indications of the actual vertical speed and the computed vertical speed enhances a pilot's situational awareness of the aircraft's actual vertical flight with respect to the computed vertical flight by enabling the pilot to view the actual vertical speed and the computed vertical speed in the same indicator.

2. The system of claim 1, wherein the source of the first vertical speed data, the second vertical speed data, or both is a flight management system.

3. The system of claim 1, wherein the computed vertical speed is a speed-based vertical speed.

4. The system of claim 3, wherein the speed-based vertical speed is dependent upon a manually-selected source of speed.

5. The system of claim 1, wherein the computed vertical speed is determined as a function of a predicted vertical flight path.

6. The system of claim 5, wherein the predicted vertical flight path is a flight idle descent path.

7. The system of claim 1, further comprising:
a source of manually-selected vertical speed data, where the image generator is further configured to:
acquire and include manually-selected vertical speed data representative of a manual selection of vertical speed in the function for generating the image data, where
the image of the aircraft VSI is further comprised of at least one of a graphical indication and a numerical indication of the manually-selected vertical speed, whereby
an alignment or nonalignment between the graphical indications of the manually-selected vertical speed and the computed vertical speed and an equality or inequality between the numerical indications of the manually-selected vertical speed and the computed vertical speed enhances a pilot's situational awareness of the aircraft's manually-selected vertical flight with respect to the computed vertical flight by enabling the pilot to view the manually-selected vertical speed and the computed vertical speed in the same indicator.

8. The system of claim 7, wherein the source of manually-selected vertical speed data is a pilot interface system configured to receive the manual selection of vertical speed.

9. A device for generating a vertical speed indicator (VSI), comprising:
an image generator including at least one processor coupled to a non-transitory processor-readable medium storing processor-executable code and configured to:
acquire actual vertical speed data representative of an actual vertical speed measured as a rate of change of altitude being experienced by an aircraft;
acquire computed vertical speed data representative of a computed vertical speed computed as a rate of change of altitude by a vertical flight guidance algorithm;
generate, image data as a function of the actual vertical speed data and the computed vertical speed data, where
the image data is representative of an image of an aircraft VSI comprised of
at least one of a graphical indication and a numerical indication of the actual vertical speed, and
at least one of a graphical indication and a numerical indication of the computed vertical speed; and
provide the image data to at least one display unit configured to present the image of the aircraft VSI to the right of an image of an altimeter and an image of an attitude indicator to the left of the image of the altimeter, where
a first computed vertical flight direction is provided by an image of a flight director overlaying the image of the attitude indicator, and
a second computed vertical flight direction is provided by the at least one of a graphical indication and a numerical indication of the computed vertical speed within the aircraft VSI, whereby
an alignment or nonalignment between the graphical indications of the actual vertical speed and the computed vertical speed and an equality or inequality between the numerical indications of the actual vertical speed and the computed vertical speed enhances a pilot's situational awareness of the aircraft's actual vertical flight with respect to the computed vertical flight by enabling the pilot to view the actual vertical speed and the computed vertical speed in the same indicator.

10. The device of claim 9, wherein the computed vertical speed is a speed-based vertical speed.

11. The device of claim 10, wherein the speed-based vertical speed is dependent upon a manually-selected source of speed.

12. The device of claim 9, wherein the computed vertical speed is determined as a function of a predicted vertical flight path.

13. The device of claim 12, wherein the predicted vertical flight path is a flight idle descent path.

14. The device of claim 9, wherein
the image generator is further configured to:
acquire and include manually-selected vertical speed data representative of a manual selection of vertical speed in the function for generating the image data, where
the image of the aircraft VSI is further comprised of at least one of a graphical indication and a numerical indication of the manually-selected vertical speed, whereby
an alignment or nonalignment between the graphical indications of the manually-selected vertical speed and the computed vertical speed and an equality or inequality between the numerical indications of the manually-selected vertical speed and the computed vertical speed enhances a pilot's situational awareness of the aircraft's manually-selected vertical flight with respect to the computed vertical flight by enabling the pilot to view the manually-selected vertical speed and the computed vertical speed in the same indicator.

15. A method for generating a vertical speed indicator (VSI), comprising:

acquiring, by an image generator including at least one processor coupled to a non-transitory processor-readable medium storing processor-executable code, actual vertical speed data from a source of vertical speed data representative of an actual vertical speed measured as a rate of change of altitude being experienced by an aircraft;

acquiring computed vertical speed data from a source of computed speed data representative of a computed vertical speed computed as a rate of change of altitude by a vertical flight guidance algorithm;

generating image data as a function of the actual vertical speed data and the computed vertical speed data, where the image data is representative of an image of an aircraft VSI comprised of at least one of a graphical indication and a numerical indication of the actual vertical speed, and at least one of a graphical indication and a numerical indication of the computed vertical speed; and providing the image data to at least one display unit configured to present the image of the aircraft VSI to the right of an image of an altimeter and an image of an attitude indicator to the left of the image of the altimeter, where a first computed vertical flight direction is provided by an image of a flight director overlaying the image of the attitude indicator, and, a second computed vertical flight direction is provided by the at least one of a graphical indication and a numerical indication of the computed vertical speed within the aircraft VSI whereby an alignment or nonalignment between the graphical indications of the actual vertical speed and the computed vertical speed and an equality or inequality between the numerical indications of the actual vertical speed and the computed vertical speed enhances a pilot's situational awareness of the aircraft's actual vertical flight with respect to the computed vertical flight by enabling the pilot to view the actual vertical speed and the computed vertical speed in the same indicator.

16. The method of claim 15, wherein the computed vertical speed is a speed-based vertical speed.

17. The method of claim 16, wherein the speed-based vertical speed is dependent upon a manually-selected source of speed.

18. The method of claim 15, wherein the computed vertical speed is determined as a function of a predicted vertical flight path.

19. The method of claim 18, wherein the predicted vertical flight path is a flight idle descent path.

20. The method of claim 15, further comprising:

acquiring and including manually-selected vertical speed data representative of a manual selection of vertical speed in the function for generating the image data, where the image of the aircraft VSI is further comprised of at least one of a graphical indication and a numerical indication of the manually-selected vertical speed, whereby an alignment or nonalignment between the graphical indications of the manually-selected vertical speed and the computed vertical speed and an equality or inequality between the numerical indications of the manually-selected vertical speed and the computed vertical speed enhances a pilot's situational awareness of the aircraft's manually-selected vertical flight with respect to the computed vertical flight by enabling the pilot to view the manually-selected vertical speed and the computed vertical speed in the same indicator.

* * * * *